US008631042B2

(12) United States Patent
Le

(10) Patent No.: US 8,631,042 B2
(45) Date of Patent: Jan. 14, 2014

(54) DATA WAREHOUSE SYSTEM

(75) Inventor: Jian Le, San Mateo, CA (US)

(73) Assignee: International Business Machines Corporation, Armonk, NY (US)

( * ) Notice: Subject to any disclaimer, the term of this patent is extended or adjusted under 35 U.S.C. 154(b) by 382 days.

(21) Appl. No.: 12/132,600

(22) Filed: Jun. 3, 2008

(65) Prior Publication Data
US 2009/0299969 A1 Dec. 3, 2009

(51) Int. Cl.
G06F 17/30 (2006.01)
G06F 7/00 (2006.01)

(52) U.S. Cl.
USPC ........... 707/796; 707/600; 707/754; 707/758; 707/769; 707/803; 707/999.102

(58) Field of Classification Search
None
See application file for complete search history.

(56) References Cited

U.S. PATENT DOCUMENTS

| 6,782,350 | B1 * | 8/2004 | Burnley et al. | 702/186 |
|---|---|---|---|---|
| 2003/0225769 | A1 * | 12/2003 | Chkodrov et al. | 707/100 |
| 2005/0060300 | A1 * | 3/2005 | Stolte et al. | 707/3 |
| 2005/0246357 | A1 | 11/2005 | Geary et al. | |
| 2007/0130171 | A1 * | 6/2007 | Hanckel et al. | 707/100 |
| 2007/0203933 | A1 | 8/2007 | Iversen et al. | |
| 2007/0294266 | A1 * | 12/2007 | Chowdhary et al. | 707/100 |

OTHER PUBLICATIONS

Henrique Madeira, Jo Costa, Marco Vieira, "The OLAP and Data Warehousing Approaches for Analysis and Sharing of Results from Dependability Evaluation Experiments," dsn, pp. 86, 2003 International Conference on Dependable Systems and Networks (DSN'03), 2003.

* cited by examiner

Primary Examiner — Sangwoo Ahn
(74) Attorney, Agent, or Firm — Mollborn Patents, Inc.; Fredrik Mollborn

(57) ABSTRACT

Methods and apparatus, including computer program products, implementing and using techniques for analyzing historical data in a data warehouse. A data warehouse is provided. The data warehouse includes several database tables. Every database table has a start time column and an end time column. A query is issued to the data warehouse. The query includes customized query predicates against the start time column values and end time column values of a database table. A response is received from the data warehouse. The response includes table records satisfying the query and having valid (START_TIME, END_TIME) ranges that cover a fixed time point specified by the customized query predicates of the query. Methods for updating a database table in a data warehouse, and a data warehouse system are also described.

17 Claims, 1 Drawing Sheet

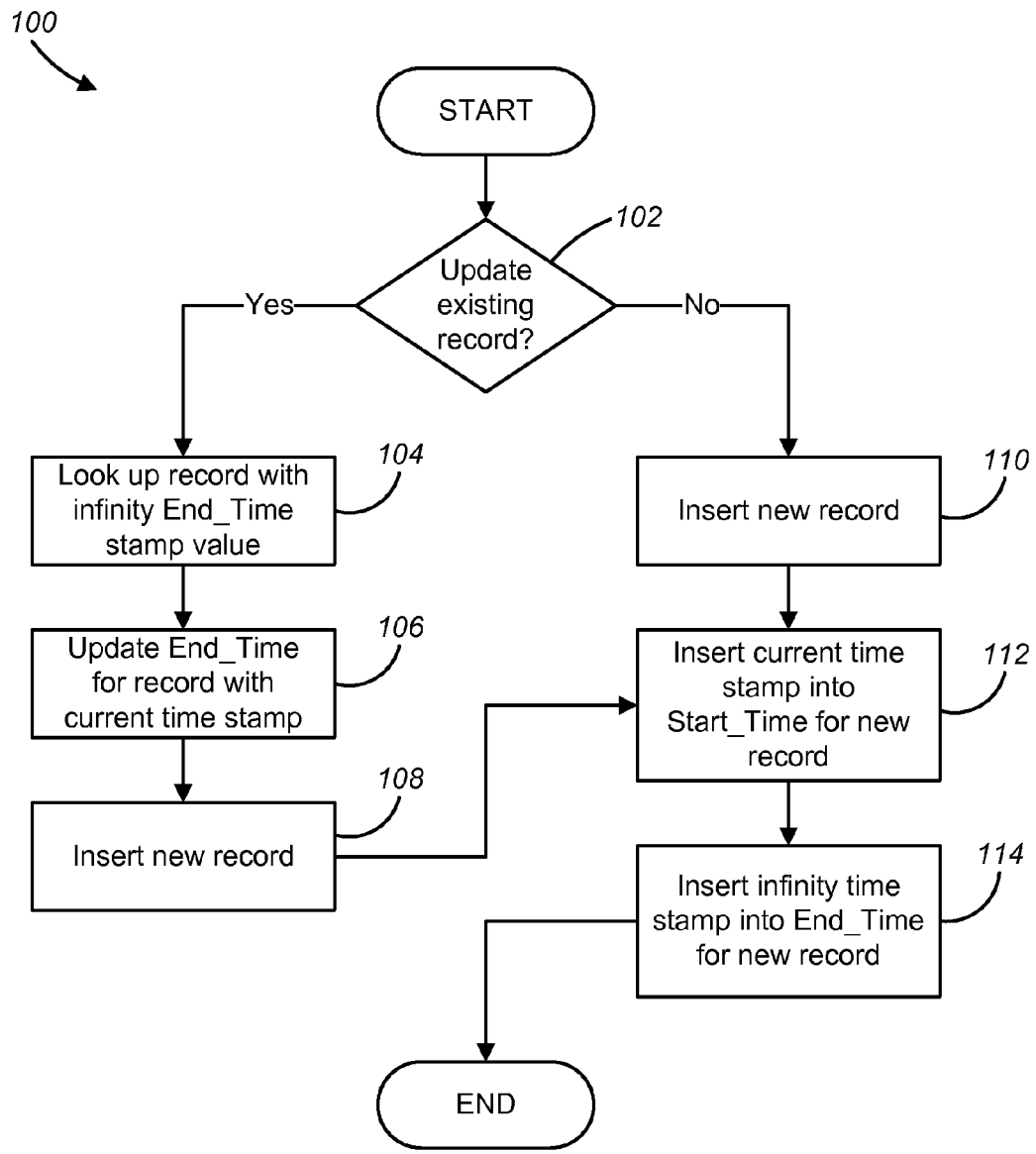

DATA WAREHOUSE SYSTEM

BACKGROUND

This invention relates to data warehouses. Data warehouse systems are very common among organizations for the purpose of monitoring business activities. Some companies have also built additional business applications, such as OLAP (On-Line Analytical Processing) applications, on top of their enterprise data warehouse systems in order to help derive intricate business metrics or to answer ad-hoc business questions.

Though new data is continuously added to an enterprise data warehouse system, these additional business applications are often built on data entities which are independent of the running state of an enterprise data warehouse system. For example, multi-dimensional OLAP cubes are typically built on physical "snapshots" of data warehouse data taken at a particular time and stored on disk.

As the data size of an enterprise data warehouse system gets increasingly larger, organizations have come to realize that they are spending more and more IT (Information Technology) resources on constructing and maintaining these physical snapshots of the enterprise data warehouse system, taken at varying points in time by individual departments with varying sub-structures of the data warehouse. As a result, some organizations are finding that they have been building and maintaining hundreds of physical snapshots of their data warehouse data to support their multi-dimensional OLAP cubes. This requires a large amount of storage resources, as well as personnel costs, and may often be of limited value as large portions of the data become stale over time.

SUMMARY

In general, in one aspect, the invention provides methods and apparatus, including computer program products, implementing and using techniques for analyzing historical data in a data warehouse. A data warehouse is provided. The data warehouse includes several database tables. Every database table has a start time column and an end time column. A query is issued to the data warehouse. The query includes customized query predicates against the start time column values and end time column values of a database table. A response is received from the data warehouse. The response includes table records satisfying the query and having valid (START_TIME, END_TIME) ranges that cover a fixed time point specified by the customized query predicates of the query.

The details of one or more embodiments of the invention are set forth in the accompanying drawings and the description below. Other features and advantages of the invention will be apparent from the description and drawings, and from the claims.

DESCRIPTION OF DRAWINGS

FIG. 1 shows an Extract Transform Load (ETL) process, in accordance with one embodiment of the invention.

Like reference symbols in the various drawings indicate like elements.

DETAILED DESCRIPTION

Overview

The various embodiments of the invention described herein pertain to data warehouse applications. In particular, the various embodiments of the invention relate to techniques for building an enterprise data warehouse system, such that the need to create and maintain physical snapshots of the enterprise data warehouse system for business applications, for example, OLAP applications, is eliminated. Further, mechanisms are provided for application users to retrieve and analyze the enterprise data warehouse data at any historical point in time by issuing SQL queries against the data warehouse system.

The invention can be implemented to include one or more of the following advantages. The data warehouse system in accordance with the various embodiments of the invention described herein eliminates the need to create and maintain multiple physical snapshots of an enterprise data warehouse system, since a single copy of warehouse data can be used to retrieve and analyze the enterprise data warehouse data at any historical point in time. Next, the various embodiments of the data warehouse system provide mechanisms for application users to retrieve and analyze this enterprise data warehouse data at any historical time point, through issuing SQL (Structured Query Language) queries against the data warehouse system. This also leads to considerable savings both in storage resources and in personnel costs. Further, the various embodiments of this data warehouse system provide one way to extend the SQL query language such that it works effectively with temporal data stored in a relational database. These efficient SQL queries for data retrieval and analysis of the data warehouse system can be developed as part of the SQL standards to help work with temporal data stored in a relational database. Finally, it should be noted that the techniques described herein are applicable to any type of data warehouses, and that applications that previously were built on top of conventional physical "snapshots," i.e. OLAP applications, can equally well be built on top of the database tables described herein.

Various embodiments of the invention will now be described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions can also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions can also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Before moving on to the details of the various embodiments of the invention, and in order to facilitate the understanding of the invention, a brief overview of some of the requirements of data warehouse systems that organizations have in order to support their business applications will first be presented. Then it will be described how the various embodiments of the invention fulfill these requirements without using any physical snapshots.

Requirements

In general, the main reason for a department to create and maintain its own physical snapshots of an enterprise data warehouse system is that each department has their own data requirements. Typically, these requirements are structural as well as temporal. For example, a Sales department may want to work with data that includes a subset of dimensions of an enterprise data warehouse that are related to sales activities over a specific time period. On the other hand, a Finance department of the same organization may want to work with data that includes a subset of dimensions that are related to accounting activities at the end of each month and/or the end of each fiscal quarter. Thus, in order to meet these varying data requirements with only a single copy of data warehouse data, as will be discussed below, the data warehouse system in accordance with the various embodiments of the invention must retain all historic data of the data warehouse.

Another reason that many departments have created their own physical snapshots of an enterprise data warehouse is that they want their data to be independent of the changing states of the enterprise data warehouse. For example, assume that a physical snapshot of a traditional data warehouse is taken on Jan. 31, 2008 by the Sales department. Then on Feb. 5, 2008, a customer returned some products purchased on Jan. 28, 2008, that is, the products were purchased before the snapshot was taken, but returned after the snapshot was taken. In a conventional enterprise data warehouse, this change will not be reflected in any physical snapshots taken before Feb. 5, 2008, but will be reflected in physical snapshots taken after Feb. 5, 2008. Thus, in order to help retain and retrieve both states of data within a single copy of the data warehouse data, the data warehouse system in accordance with the various embodiments of the invention must keep track of the changing states of historical data. Likewise, the data warehouse in accordance with various embodiments of the invention must provide a mechanism for a user to recover the historical state of the enterprise data warehouse data, both before and after Feb. 5, 2008, that is, the date when the products were returned, using a single copy of data warehouse data.

Yet another reason that many departments have created their own physical snapshots of an enterprise data warehouse data is that they want their data to be available independently of the availability of an enterprise data warehouse system. For example, when the enterprise data warehouse system is off-line, the departments would like to keep their departmental business applications on-line. Thus, in order to meet this requirement using a single copy of data warehouse data for multiple business applications, the data warehouse system in accordance with the various embodiments of the invention must be highly available.

An exemplary embodiment of the data warehouse system that meets these requirements will now be described. It should be noted that this is merely one example, and that many variations are possible, as will be discussed in further detail below.

Data Warehouse System

In one embodiment, the data warehouse system includes a set of tables. Some tables are fact tables and some tables are dimension tables. In general, fact tables contain table records whose field values are usually associated with business transaction values, such as sales and cost values of products being sold at a particular store on a particular date. Dimension tables contain table records that are associated with detailed attributes of a specific product, detailed attributes of a particular store, and detailed attributes of a particular date. Since detailed attribute information is not needed for data processing of business transaction values stored in a fact table, most data warehouse designers have chosen to keep only an identifier of a business attribute inside the fact tables to help reduce the overall data volume of a fact table. Then, during the data warehouse schema design process of this new system, two extra table columns, START_TIME and END_TIME, are added to every table within the data warehouse system.

As is well known to those of ordinary skill in the art, in conventional data warehouses, there may be tables that include START_TIME and END_TIME columns. For example, this is the case with the so-called Slowly Changing Dimension (Type II) tables, where historical information is retained for a few dimension tables. In contrast, in the various embodiments of this invention, the START_TIME and END_TIME columns are added to each table, which causes the entire data warehouse to become time-dependent, and thereby eliminates the need for maintaining snapshots of data warehouse data.

FIG. 1 shows an Extract Transform Load (ETL) process (100), in accordance with one embodiment of the invention. As can be seen in FIG. 1, the ETL (Extract, Transform, and Load) process (100) starts by determining whether an existing record is to be updated or a new record is to be inserted (step 102). If it is determined that an existing record should be updated, the process looks up the existing table record, whose END_TIME column field has the infinity timestamp value (step 104). The infinity timestamp value of the looked-up table record is then updated with the current timestamp value (step 106). A new table record containing the updated value is then inserted into the table (step 108). The steps for inserting this new table record are the same as the steps for inserting a completely new record, which will now be described.

If it is determined in step 102 that a new record is to be inserted, the process continues to step 110, where the new record is received and inserted into the table. As part of inserting the new record, a current timestamp value is inserted into the START_TIME column field (step 112) and an "infinity timestamp" value is inserted into the END_TIME column field (step 114). The infinity timestamp can be represented, for example, by a large number or by a specific set of characters, such as the largest date-time stamp value 9999-99-99-00.00.00. However, the choice of infinity timestamp value is up to the designer of the database. In some cases, database designers have chosen to use a NULL value to represent the infinity value, for example.

In order to further improve the understanding of the invention, an example will now be presented that shows the changes made to the table in accordance with the process described above with reference to FIG. 1. In this example, it is assumed that a set of three new table records are added to a fact table. The fact table has a Product dimension foreign key column, a Time dimension foreign key column, and a Sales measure column. At 2008-2-1-00.00.00 (i.e., at midnight on Feb. 1, 2008), the resulting fact table will look as shown below in Table 1.

TABLE 1

| Product_ID | Time_ID | Sales | START_TIME | END_TIME |
|---|---|---|---|---|
| 1 | 2 | 526.98 | 2008-2-1-00.00.00 | 9999-99-99-00.00.00 |
| 1 | 1 | 230.43 | 2008-2-1-00.00.00 | 9999-99-99-00.00.00 |
| 2 | 2 | 893.04 | 2008-2-1-00.00.00 | 9999-99-99-00.00.00 |

When another set of three new records are added to the fact table at 2008-3-1-00.00.00 (i.e., at midnight on Mar. 1, 2008) and an existing record having a (Product_ID, Time_ID) of (1, 2) is updated at the same time, the fact table shown in Table 1 will look like the fact table in Table 2 below after the insert operation.

TABLE 2

| Product_ID | Time_ID | Sales | START_TIME | END_TIME |
|---|---|---|---|---|
| 1 | 2 | 526.98 | 2008-2-1-00.00.00 | 9999-99-99-00.00.00 |
| 1 | 1 | 230.43 | 2008-2-1-00.00.00 | 9999-99-99-00.00.00 |
| 2 | 2 | 893.04 | 2008-2-1-00.00.00 | 9999-99-99-00.00.00 |
| 1 | 3 | 634.90 | 2008-3-1-00.00.00 | 9999-99-99-00.00.00 |
| 1 | 4 | 304.15 | 2008-3-1-00.00.00 | 9999-99-99-00.00.00 |
| 2 | 4 | 1003.93 | 2008-3-1-00.00.00 | 9999-99-99-00.00.00 |

After the update operation, Table 2 will change to look like Table 3 below.

TABLE 3

| Product_ID | Time_ID | Sales | START_TIME | END_TIME |
|---|---|---|---|---|
| 1 | 2 | 526.98 | 2008-2-1-00.00.00 | 2008-3-1-00.00.00 |
| 1 | 1 | 230.43 | 2008-2-1-00.00.00 | 9999-99-99-00.00.00 |
| 2 | 2 | 893.04 | 2008-2-1-00.00.00 | 9999-99-99-00.00.00 |
| 1 | 3 | 634.90 | 2008-3-1-00.00.00 | 9999-99-99-00.00.00 |
| 1 | 4 | 304.15 | 2008-3-1-00.00.00 | 9999-99-99-00.00.00 |
| 2 | 4 | 1003.93 | 2008-3-1-00.00.00 | 9999-99-99-00.00.00 |
| 1 | 2 | 487.75 | 2008-3-1-00.00.00 | 9999-99-99-00.00.00 |

The key observation here is that when a new record at (1, 2) is first added to a table, the new record has a valid time span of (T1, infinity), where T1 is the moment when this record is added to the table. When this record at (1, 2) is subsequently updated at time T2, the valid time span of the original record at (1, 2) becomes (T1, T2) and a new record at (1, 2) with the updated Sales value is added to the table with a valid time span of (T2, infinity), as shown in Table 3 above. If the record at (1, 2) gets updated again at a time T3, the record at (1, 2) with a valid time span of (T2, infinity) is changed to (T2, T3), and a new record at (1, 2) bearing a valid time span of (T3, infinity) will be added to the table, and so on. However, the first table record at (1, 2) with a valid time span of (T1, T2) is left untouched.

Now, to continue the previous example, assume that a third set of three new table records is added to the fact table (i.e., Table 3) at 2008-4-1-00.00.00 (i.e., at midnight on Apr. 1, 2008), the fact table will after the insert operation look like Table 4 below.

TABLE 4

| Product_ID | Time_ID | Sales | START_TIME | END_TIME |
|---|---|---|---|---|
| 1 | 2 | 526.98 | 2008-2-1-00.00.00 | 2008-3-1-00.00.00 |
| 1 | 1 | 230.43 | 2008-2-1-00.00.00 | 9999-99-99-00.00.00 |
| 2 | 2 | 893.04 | 2008-2-1-00.00.00 | 9999-99-99-00.00.00 |
| 1 | 3 | 634.90 | 2008-3-1-00.00.00 | 9999-99-99-00.00.00 |
| 1 | 4 | 304.15 | 2008-3-1-00.00.00 | 9999-99-99-00.00.00 |
| 2 | 4 | 1003.93 | 2008-3-1-00.00.00 | 9999-99-99-00.00.00 |
| 1 | 2 | 487.75 | 2008-3-1-00.00.00 | 9999-99-99-00.00.00 |
| 1 | 5 | 788.90 | 2008-4-1-00.00.00 | 9999-99-99-00.00.00 |
| 1 | 6 | 374.29 | 2008-4-1-00.00.00 | 9999-99-99-00.00.00 |
| 2 | 6 | 1104.93 | 2008-4-1-00.00.00 | 9999-99-99-00.00.00 |

Validation of Requirements

The remaining question to be answered is whether Table 4 satisfies all the requirements listed above in the "requirements" section. To verify this, it is necessary to examine how the above operations would be reflected in a conventional fact table without the START_TIME and END_TIME table columns. For example, when a set of three new records are added to a conventional fact table at 2008-2-1-00.00.00 (i.e., at midnight on Feb. 1, 2008) that has a Product dimension foreign key column, a Time dimension foreign key column, and a Sales measure column, the fact table will look as shown in Table 5 below.

TABLE 5

| Product_ID | Time_ID | Sales |
|---|---|---|
| 1 | 2 | 526.98 |
| 1 | 1 | 230.43 |
| 2 | 2 | 893.04 |

Next, when another set of three new records are added to the fact table at 2008-3-1-00.00.00 (i.e., on Mar. 1, 2008, at midnight) and an existing record at (1, 2) is updated at the same time, the conventional fact table will look like Table 6 below after the insert operation, and like Table 7 below after the update operation.

TABLE 6

| Product_ID | Time_ID | Sales |
|---|---|---|
| 1 | 2 | 526.98 |
| 1 | 1 | 230.43 |
| 2 | 2 | 893.04 |
| 1 | 3 | 634.90 |
| 1 | 4 | 304.15 |
| 2 | 4 | 1003.93 |

TABLE 7

| Product_ID | Time_ID | Sales |
|---|---|---|
| 1 | 2 | 487.75 |
| 1 | 1 | 230.43 |
| 2 | 2 | 893.04 |
| 1 | 3 | 634.90 |
| 1 | 4 | 304.15 |
| 2 | 4 | 1003.93 |

Finally, when a third set of three new records is added to the fact table at 2008-4-1-00.00.00 (i.e., at midnight on Apr. 1, 2008), the conventional fact table will look like Table 8 below after the insert operation.

TABLE 8

| Product_ID | Time_ID | Sales |
|---|---|---|
| 1 | 2 | 487.75 |
| 1 | 1 | 230.43 |
| 2 | 2 | 893.04 |
| 1 | 3 | 634.90 |
| 1 | 4 | 304.15 |
| 2 | 4 | 1003.93 |
| 1 | 5 | 788.90 |
| 1 | 6 | 374.29 |
| 2 | 6 | 1104.93 |

With the set of new data warehouse tables (i.e., Table 1 through Table 4) in accordance with the various embodiments of the invention, and the set of conventional data warehouse tables (i.e., Table 5 through Table 8), it is now possible to examine how snapshots of the conventional tables can be retrieved from the new tables, in accordance with various embodiments of the invention.

Assume, for example, that a physical snapshot of Table 5 was taken at 2008-2-2-10.30.00 (i.e., at 10:30 a.m. on Feb. 2, 2008). The snapshot image would include the following data, labeled Snapshot 1, below:

Snapshot 1

| Product_ID | Time_ID | Sales |
|---|---|---|
| 1 | 2 | 526.98 |
| 1 | 1 | 230.43 |
| 2 | 2 | 893.04 |

Similarly, if a physical snapshot of Table 7 was taken at 2008-3-2-10.30.00 (i.e., at 10:30 a.m. on Mar. 2, 2008), the snapshot image would include the following data, labeled Snapshot 2, below:

Snapshot 2

| Product_ID | Time_ID | Sales |
|---|---|---|
| 1 | 2 | 487.75 |
| 1 | 1 | 230.43 |
| 2 | 2 | 893.04 |
| 1 | 3 | 634.90 |
| 1 | 4 | 304.15 |
| 2 | 4 | 1003.93 |

If Snapshot 1 is not kept after 2008-3-1-00.00.00 (i.e., midnight of Mar. 1, 2008) and a business user wants to analyze the Snapshot 1 data on 2008-3-4-10.00.00 (i.e., 10:00 a.m. on Mar. 4, 2008), it is not possible to recover the Snapshot 1 data by simply taking a new snapshot of data in Table 7, due to the changes that occurred in the interim. However, with the new tables in accordance with the various embodiments of the invention, a user can recover the Snapshot 1 data from the data in Table 3 by executing the follow SQL query, Query 1:

SELECT * FROM Table_3
WHERE START_TIME <= 2008-2-2-10.30.00
AND END_TIME > 2008-2-2-10.30.00

Similarly, if Snapshot 2 is not kept after 2008-4-1-00.00.00 (i.e., midnight on Apr. 1, 2008), a user cannot recover the Snapshot 2 data from the data in Table 8 due to the changes in the interim. However, it is possible to recover equivalent data to Snapshot 2 from the data in Table 4 by executing the following SQL query, Query 2:

SELECT * FROM Table_4
WHERE START_TIME <= 2008-3-2-10.30.00
AND END_TIME > 2008-3-2-10.30.00

Thus, it has been verified that the data warehouse system in accordance with various embodiments of the invention has retained all historical physical snapshots in a single copy of data warehouse data. In fact, the described data warehouse system has not only retained the historical snapshots taken at discrete time points, but has retained all historical data on a continuous time spectrum up to the latest point where the new data warehouse system was updated. Whereas in the traditional data warehouse approach, if the Finance department forgot to take a physical snapshot at the end of a prior month, or an existing snapshot data had some problems, or if the Finance department wanted to take a special physical snapshot in the middle of a prior month, the IT department would not be able to retrieve the desired historical data from a traditional data warehouse system unless the IT department had backed up the system whenever the data warehouse data is refreshed. This is almost impossible for a near real-time enterprise data warehouse system. However, with the data warehouse approach in accordance with various embodiments of the invention, an application user can choose to work with the historical data at any historical time point, simply by specifying a pair of special predicates in their SQL queries.

The final requirement that needs to be addressed is the high-availability requirement of this data warehouse system. As outlined above, there are two types of data that need to be added to this new data warehouse system during a warehouse refresh window. One is the new records that do not affect any existing table records. The other is the update records that affect the END_TIME column field values of some existing table records. Thus, to help keep the data warehouse system highly available, it is recommended that a user controls the types of data that need to be refreshed within each data warehouse refresh window. For example, if a user has planned to refresh their enterprise data warehouse system four times a day and one of these four times is scheduled at an off-peak time window, it is recommended that the user keeps the system on-line and only adds new records to the system during these three on-line refresh windows. Then, during the off-peak refresh window, the user can take the system offline and refresh the system with the update records accumulated during the day. Since the update records within a day typically are fewer than the new records, an extended downtime window is not expected. For organizations who cannot afford any system down-time during a 24-hour window, it is recommended to trickle feed the update records into the data warehouse system between the normal refresh windows, and to batch feed the new records into the data warehouse system during the normal refresh windows.

Other Considerations

The data warehouse system described above has been described with respect to a single fact table, in order to facilitate an easy understanding of the invention. However, as the skilled reader realizes, the same ETL process will be applied to the whole data warehouse system that may have multiple fact tables and multiple dimension tables. As discussed above, the fundamental technical merit is that each record of each table of the data warehouse system has been made a function of Time. If each table record is a continuous function of Time, each table itself is a continuous function of Time. Thus, if each table is a continuous function of Time, the whole data warehouse system is a continuous function of Time.

In practice, a user can issue queries (similar to Queries 1 and 2 shown above) to each table of the data warehouse system, in order to extract the desired table records using this special pair of predicates plus other query predicates, and join the extracted table records from each table to get the desired query results. Most participating tables of a SQL query issued against the data warehouse system would require a special pair of time predicates such as:

```
START_TIME <= the chosen time point AND
END_TIME > the chosen time point
```

For example, a user may issue a query as follows:

```
Query 3:
SELECT T1.*, T2.*
FROM Table_4 AS T1, Time AS T2
WHERE T1.Time_ID = T2.Time_ID
AND (T1.START_TIME <= 2008-3-2-10.30.00
AND T1.END_TIME > 2008-3-2-10.30.00)
AND (T2.START_TIME <= 2008-3-2-10.30.00
AND T2.END_TIME > 2008-3-2-10.30.00)
``` where table Time holds the detailed attributes of a particular date, for example.

Then, the SQL query statements (Query 1 through Query 3) can be simplified by introducing a new SQL syntax, such as a Filter By clause:

```
With clause
Select clause
From clause
Where clause
Filter By clause
Group By clause
Having clause
Order By clause
``` where the Filter By clause will apply a special pair of time predicates to all tables that have appeared in the From clause of the same SQL query with a special sign such as a plus sign. For example, Query 1 above can be simplified into:

```
SELECT * FROM Table_3+
FILTER BY 2008-2-2-10.30.00
```

And Query 3 above can be simplified into:

```
SELECT T1.*, T2.*
FROM Table_4 AS T1+, Time AS T2+
WHERE T1.Time_ID = T2.Time_ID
FILTER BY 2008-3-2-10.30.00
```

Furthermore, this temporal information can be extended into other query language such as MDX (multi-dimensional expression). For example:

```
SELECT [Time].[2008] ON COLUMNS, [Product].members ON ROWS
FROM
[Sales] FILTER BY 2008-2-2-10.30.00.
```

Finally, this temporal information can also be encoded in some generic ETL jobs as well as in multi-dimensional metadata stores such that appropriate data is extracted from a single copy of enterprise data warehouse data for various kinds of business applications.

The flowchart and block diagrams in the figures referred to above illustrate the architecture, functionality, and operation of possible implementations of systems, methods and computer program products according to various embodiments of the invention. In this regard, each block in the flowchart or block diagrams can represent a module, segment, or portion of code, which comprises one or more executable instructions for implementing the specified logical function(s). It should also be noted that, in some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As will be appreciated by one skilled in the art, various embodiments of the invention can include a system, method or computer program product. Accordingly, the invention can take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the invention can take the form of a computer program product embodied in any tangible medium of expression having computer-usable program code embodied in the medium.

Any combination of one or more computer usable or computer readable medium(s) can be used. The computer-usable or computer-readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium can be any medium that can contain, store, communicate, propagate, or transport the program for use by or in connection with the instruction execution system, apparatus, or device. The computer-usable medium can include a propagated data signal with the computer-usable program code embodied therewith, either in baseband or as part of a carrier wave. The computer usable program code can be transmitted using any appropriate medium, including but not limited to wireless, wireline, optical fiber cable, RF, and so on.

Computer program code for carrying out operations of the invention can be written in any combination of one or more programming languages, including an object oriented programming language such as Java, Smalltalk, C++ or the like and conventional procedural programming languages, such as the "C" programming language or similar programming languages. The program code can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider).

A number of implementations of the invention have been described. Nevertheless, it will be understood that various modifications may be made without departing from the spirit and scope of the invention. For example, the use of temporal information described above, can be extended in various ways, such as into SQL-based ETL jobs using the Filter By clause described above, or to a new query language called MDX which uses the Filter By clause. The temporal information can also be extended to a multi-dimensional metadata store, such that a query generation tool based on stored metadata can insert the appropriate temporal information into a generated SQL or MDX query. Accordingly, other embodiments are within the scope of the following claims.

The invention claimed is:

1. A computer-implemented method for analyzing historical data in a data warehouse, comprising:
   providing a data warehouse, wherein
      each fact table within the data warehouse has a start time column and an end time column,
      each record of the fact tables has a start time value specified in the start time column, the start time value indicating an insertion time stamp of the record into the fact table,
      each record of the fact tables has an end time value specified in the end time column, the end time value being one of: an infinity time stamp indicating that the record is a current record and a non-infinity time stamp indicating that the record is a historical record, and
      the fact tables within the data warehouse collectively form a single searchable copy of data warehouse data that contains both continuous historical data and current data for the data warehouse; and
   in response to a query against the data warehouse, retrieving records from one or more fact tables using a pair of customized query predicates against the start time column values and the end time column values of the one or more fact tables.

2. The method of claim 1, wherein the data warehouse further includes one or more dimension tables.

3. The method of claim 1, wherein the query is expressed in a Structured Query Language.

4. The method of claim 3, wherein the query includes one or more of: a With clause, a Select clause, a From clause, a Where clause, a Filter By clause, a Group By clause, a Having clause, and an Order By clause.

5. The method of claim 4, wherein the From clause specifies one or more fact tables and the Filter By clause specifies a date and time.

6. The method of claim 4, wherein a subset of tables in the From clause are marked with a special symbol.

7. The method of claim 6, wherein the Filter By clause applies to fact tables in the From clause that are marked with the special symbol.

8. The method of claim 1, wherein the query is expressed in a Multi-Dimensional Expression language.

9. A computer-implemented method for updating a record in a data warehouse, comprising:

providing a data warehouse, wherein
- each fact table within the data warehouse has a start time column and an end time column,
- each record of the fact table has a start time value specified in the start time column, the start time value indicating an insertion time stamp of the record into the fact table
- each record of the fact table has an end time value specified in the end time column, the end time value being one of: an infinity time stamp indicating that the record is a current record and a non-infinity time stamp indicating that the record is a historical record, and
- the fact tables within the data warehouse collectively form a single searchable copy of data warehouse data that contains both continuous historical data and current data for the data warehouse; and in response to determining that a record within a fact table of the data warehouse needs to be updated:
- updating an end time value for the record in the end time column with a current time stamp; and
- inserting a new record comprising updates of the record into the fact table, the new record having a current time stamp in the start time column and an infinity time stamp in the end time column.

10. The method of claim 9, wherein the data warehouse further includes one or more dimension tables.

11. The method of claim 9, wherein the current time stamp includes one or more of: a year, a month, a date, an hour, a minute and a second.

12. The method of claim 9, wherein the infinity time stamp includes a specific set of characters.

13. The method of claim 12, wherein the specific set of characters includes one of: a large time stamp value and a NULL value.

14. A data warehouse system, including:
a processor;
a computer-readable storage medium configured to store one or more tables in a data warehouse, wherein:
- each fact table within the data warehouse includes a start time column and an end time column,
- each record of the fact table has a start time value specified in the start time column, the start time value indicating an insertion time stamp of the record into the fact table,
- each record of the fact tables has an end time value specified in the end time column, the end time value being one of: an infinity time stamp indicating that the record is a current record and a non-infinity time stamp indicating that the record is a historical record, and
- the fact tables within the data warehouse collectively form a single searchable copy of data warehouse data that contains both continuous historical data and current data for the data warehouse: and a query module, the query module being configured to:
- in response to a query against the data warehouse, retrieve records from one or more fact tables referenced by the query using a pair of customized query predicates against the start time column values and the end time column values of the one or more fact tables.

15. The data warehouse system of claim 14, wherein the data warehouse further includes one or more dimension tables.

16. The data warehouse system of claim 14, wherein at least one of the start time value and the end time value includes one or more of: a year, a month, a date, an hour, a minute and a second.

17. The data warehouse system of claim 14, wherein the pair of customized query predicates includes a $START_{13}TIME$ value and an END_TIME value.

* * * * *